United States Patent
Jo et al.

(10) Patent No.: US 10,120,481 B2
(45) Date of Patent: Nov. 6, 2018

(54) METHOD AND APPARATUS FOR HANDLING TOUCH INPUT IN A MOBILE TERMINAL

(71) Applicant: Samsung Electronics Co., Ltd, Gyeonggi-do (KR)

(72) Inventors: Hee-Jae Jo, Gyeonggi-do (KR);
Se-Hoon Lim, Gwangju (KR);
Seung-Jae Han, Gyeonggi-do (KR);
Hyoung-Il Kim, Gyeonggi-do (KR);
Jung-Sic Sung, Gyeonggi-do (KR);
Ju-Beam Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 13/631,555

(22) Filed: Sep. 28, 2012

(65) Prior Publication Data

US 2013/0082962 A1     Apr. 4, 2013

(30) Foreign Application Priority Data

Sep. 30, 2011   (KR) .................. 10-2011-0100202
Nov. 15, 2011   (KR) .................. 10-2011-0118965

(51) Int. Cl.
*G09G 1/00* (2006.01)
*G06F 3/041* (2006.01)

(52) U.S. Cl.
CPC ................. *G06F 3/0416* (2013.01)

(58) Field of Classification Search
CPC ........................................ G06F 3/043
USPC .......................................... 345/173
See application file for complete search history.

(56) References Cited

U.S. PATENT DOCUMENTS

| | | | |
|---|---|---|---|
| 2004/0090432 A1 | 5/2004 | Takahashi et al. | |
| 2004/0140956 A1 | 7/2004 | Kushler et al. | |
| 2005/0030293 A1 | 2/2005 | Lai | |
| 2007/0018966 A1* | 1/2007 | Blythe .................. | G06F 3/0488 345/173 |
| 2008/0309630 A1* | 12/2008 | Westerman .......... | G06F 3/0418 345/173 |
| 2009/0078474 A1 | 3/2009 | Fleck et al. | |

(Continued)

FOREIGN PATENT DOCUMENTS

| | | |
|---|---|---|
| CN | 101639896 | 2/2010 |
| JP | H9-91079 A | 4/1997 |
| JP | 2004-157620 A | 6/2004 |
| JP | 2009-93641 A | 4/2009 |
| KR | 10-2006-0017743 A | 2/2006 |

OTHER PUBLICATIONS

Cornell Univeristy, www.cs.cornell.edu/courses/cs4758/2012sp/materials/mi63slides.pdf pp. 1-10, Jul. 1, 2015.*

(Continued)

*Primary Examiner* — Michael Faragalla (57) ABSTRACT

An apparatus is configured to perform a method for scrolling a display screen to correspond to a touch input in a mobile terminal. Upon detecting a touch input, the mobile terminal determines an actual coordinate value of the detected touch input, obtains a predicted coordinate value for the determined actual coordinate value, obtains a smoothed coordinate value by performing a smoothing operation on the obtained predicted coordinate value, and determines that the detected touch input has occurred at the obtained smoothed coordinate value.

10 Claims, 10 Drawing Sheets

(56) References Cited

U.S. PATENT DOCUMENTS

| | | | | |
|---|---|---|---|---|
| 2010/0020035 A1* | 1/2010 | Ryu | ................... | G06F 3/04883 |
| | | | | 345/173 |
| 2010/0073318 A1* | 3/2010 | Hu | ......................... | G06F 3/044 |
| | | | | 345/174 |
| 2010/0117962 A1 | 5/2010 | Westerman et al. | | |
| 2010/0289826 A1 | 11/2010 | Park et al. | | |
| 2012/0326995 A1* | 12/2012 | Zhang et al. | ................ | 345/173 |

OTHER PUBLICATIONS

First Office Action dated Jul. 4, 2016 in connection with Chinese Application No. 201210369337.0, 10 pages.
European Patent Office, "European Search Report," Application No. EP 12 18 6670, Jul. 24, 2017, 8 pages.
The Korean Intellectual Property Office, "Notification of the Reasons for Rejection," Application No. KR 10-2011-0118965, dated Sep. 22, 2017, 7 pages.
The Korean Intellectual Property Office, "Notification of the Reasons for Rejection," Application No. KR 10-2011-0100202, dated Jul. 27, 2017, 9 pages.
Communication from a foreign patent office in a counterpart foreign application, The Korean Intellectual Property Office, "Notification of the Reasons for Rejection," Application No. KR 10-2010-0100202, dated Apr. 6, 2018, 7 pages.
Communication from a foreign patent office in a counterpart foreign application, KIPO, "Decision of Grant" Application No. KR 10-2011-0100202, dated Aug. 6, 2018, 7 pages.

\* cited by examiner

| | ACTUAL COORDINATE VALUE | PREDICTED COORDINATE VALUE | SMOOTHED COORDINATE VALUE | PreH | PreL | xH | xL | d |
|---|---|---|---|---|---|---|---|---|
| 1 | 150 | 150 | 150 | 150 | 150 | 150 | 150 | 0 |
| 2 | 150 | 150 | 150 | 150 | 150 | 150 | 150 | 0 |
| 3 | 150 | 150 | 150 | 150 | 150 | 150 | 150 | 0 |
| 4 | 150 | 150 | 150 | 150 | 150 | 150 | 150 | 0 |
| 5 | 150 | 150 | 150 | 150 | 150 | 150 | 150 | 0 |
| 6 | 165 | 167.1 | 153.42 | 163.5 | 150 | 163.5 | 151.5 | 3.6 |
| 7 | 180 | 185.55 | 160.53 | 178.35 | 151.5 | 178.35 | 154.35 | 7.2 |
| 8 | 195 | 203.811 | 171.2922 | 193.335 | 154.35 | 193.335 | 158.415 | 10.476 |
| 9 | 210 | 221.7615 | 185.6445 | 208.3335 | 158.415 | 208.3335 | 163.5735 | 13.428 |
| 10 | 225 | 239.41851 | 203.528202 | 223.33335 | 163.5735 | 223.33335 | 169.71615 | 16.08516 |
| 11 | 240 | 256.809975 | 221.470197 | 238.33334 | 169.71615 | 238.33334 | 176.74454 | 18.47664 |
| 12 | 255 | 273.9623091 | 239.1526588 | 253.33333 | 176.74454 | 253.33333 | 184.57008 | 20.628976 |
| 13 | 270 | 290.8994114 | 256.5703411 | 268.33333 | 184.57008 | 268.33333 | 193.11307 | 22.566078 |
| 14 | 285 | 307.6428035 | 273.7466018 | 283.33333 | 193.11307 | 283.33333 | 202.30177 | 24.30947 |
| 15 | 300 | 324.2118565 | 290.7052711 | 298.33333 | 202.30177 | 298.33333 | 212.07159 | 25.878523 |
| 16 | 315 | 340.6240042 | 307.4680769 | 313.33333 | 212.07159 | 313.33333 | 222.36443 | 27.290671 |
| 17 | 330 | 356.8949371 | 324.0546025 | 328.33333 | 222.36443 | 328.33333 | 233.12799 | 28.561604 |
| 18 | 345 | 373.0387767 | 340.4824756 | 343.33333 | 233.12799 | 343.33333 | 244.31519 | 29.705443 |
| 19 | 360 | 389.0682324 | 356.7675614 | 358.33333 | 244.31519 | 358.33333 | 255.88367 | 30.734899 |
| 20 | 375 | 404.9947425 | 372.9241386 | 373.33333 | 255.88367 | 373.33333 | 267.7953 | 31.661409 |
| 21 | 390 | 420.8286016 | 388.9650581 | 388.33333 | 267.7953 | 388.33333 | 280.01577 | 32.495268 |
| 22 | 405 | 436.5790747 | 404.9018856 | 403.33333 | 280.01577 | 403.33333 | 292.5142 | 33.245741 |
| 23 | 420 | 452.2545006 | 420.7450304 | 418.33333 | 292.5142 | 418.33333 | 305.26278 | 33.921167 |
| 24 | 435 | 467.8623839 | 436.5038607 | 433.33333 | 305.26278 | 433.33333 | 318.2365 | 34.529051 |
| 25 | 450 | 483.4094788 | 452.1868079 | 448.33333 | 318.2365 | 448.33333 | 331.41285 | 35.076145 |
| 26 | 465 | 498.9018643 | 467.8014605 | 463.33333 | 331.41285 | 463.33333 | 344.77156 | 35.568531 |
| 27 | 480 | 514.3450112 | 483.3546478 | 478.33333 | 344.77156 | 478.33333 | 358.29441 | 36.011678 |

FIG. 5A

| | ACTUAL COORDINATE VALUE | PREDICTED COORDINATE VALUE | SMOOTHED COORDINATE VALUE | PreH | PreL | xH | xL | d |
|---|---|---|---|---|---|---|---|---|
| 28 | 495 | 529.7438434 | 498.8525163 | 478.33333 | 358.29441 | 493.33333 | 371.96497 | 36.41051 |
| 29 | 510 | 545.1027924 | 514.300598 | 493.33333 | 371.96497 | 508.33333 | 385.76847 | 36.769459 |
| 30 | 525 | 560.4258465 | 529.7038715 | 508.33333 | 385.76847 | 523.33333 | 399.69162 | 37.092513 |
| 31 | 540 | 575.7165952 | 545.0668177 | 523.33333 | 399.69162 | 538.33333 | 413.72246 | 37.383262 |
| 32 | 555 | 590.978269 | 560.3934693 | 538.33333 | 413.72246 | 553.33333 | 427.85021 | 37.644936 |
| 33 | 570 | 606.2137754 | 575.6874557 | 553.33333 | 427.85021 | 568.33333 | 442.06519 | 37.880442 |
| 34 | 585 | 621.4257312 | 590.9520435 | 568.33333 | 442.06519 | 583.33333 | 456.35867 | 38.092398 |
| 35 | 600 | 636.6164914 | 606.1901724 | 583.33333 | 456.35867 | 598.33333 | 470.72281 | 38.283158 |
| 36 | 600 | 634.6881756 | 617.9844885 | 598.33333 | 470.72281 | 599.83333 | 483.65053 | 34.854842 |
| 37 | 600 | 631.3926914 | 626.067373 | 599.83333 | 483.65053 | 599.98333 | 495.28547 | 31.409358 |
| 38 | 600 | 628.2707556 | 630.478769 | 599.98333 | 495.28547 | 599.99833 | 505.75693 | 28.272422 |
| 39 | 600 | 625.4454134 | 631.2827055 | 599.99833 | 505.75693 | 599.99983 | 515.18123 | 25.44558 |
| 40 | 600 | 622.9010454 | 628.5396163 | 599.99983 | 515.18123 | 599.99998 | 523.66311 | 22.901062 |
| 41 | 600 | 620.6109582 | 625.7241728 | 599.99998 | 523.66311 | 600 | 531.2968 | 20.61096 |
| 42 | 600 | 618.5498641 | 623.1556073 | 600 | 531.2968 | 600 | 538.16712 | 18.549864 |
| 43 | 600 | 616.6948778 | 620.8404318 | 600 | 538.16712 | 600 | 544.35041 | 16.694878 |
| 44 | 600 | 615.0253901 | 618.7564271 | 600 | 544.35041 | 600 | 549.91537 | 15.02539 |
| 45 | 600 | 613.5228511 | 616.8807882 | 600 | 549.91537 | 600 | 554.92383 | 13.522851 |
| 46 | 600 | 612.170566 | 615.1927098 | 600 | 554.92383 | 600 | 559.43145 | 12.170566 |
| 47 | 600 | 610.9535094 | 613.6734389 | 600 | 559.43145 | 600 | 563.4883 | 10.953509 |
| 48 | 600 | 609.8581584 | 612.306095 | 600 | 563.4883 | 600 | 567.13947 | 9.8581584 |
| 49 | 600 | 608.8723426 | 611.0754855 | 600 | 567.13947 | 600 | 570.42552 | 8.8723426 |
| 50 | 600 | 607.9851083 | 609.9679369 | 600 | 570.42552 | 600 | 573.38297 | 7.9851083 |
| 51 | 600 | 607.1865975 | 608.9711432 | 600 | 573.38297 | 600 | 576.04468 | 7.1865975 |
| 52 | 600 | 606.4679377 | 608.0740289 | 600 | 576.04468 | 600 | 578.44021 | 6.4679377 |
| 53 | 600 | 605.821144 | 607.266626 | 600 | 578.44021 | 600 | 580.59619 | 5.821144 |
| 54 | 600 | 605.2390296 | 606.5399634 | 600 | 580.59619 | 600 | 582.53657 | 5.2390296 |

METHOD AND APPARATUS FOR HANDLING TOUCH INPUT IN A MOBILE TERMINAL

CROSS-REFERENCE TO RELATED APPLICATION(S) AND CLAIM OF PRIORITY

The present application is related to and claims the benefit under 35 U.S.C. § 119(a) of a Korean Patent Application filed in the Korean Intellectual Property Office on Sep. 30, 2011 and assigned Serial No. 10-2011-0100202, and a Korean Patent Application filed in the Korean Intellectual Property Office on Nov. 15, 2011 and assigned Serial No. 10-2011-0118965, the entire disclosure of both of which is incorporated herein by reference.

TECHNICAL FIELD OF THE INVENTION

The present disclosure relates generally to the use of a touch screen, and more particularly, to a method and apparatus for handling touch inputs, such as updating and displaying display screens to correspond to user's touch inputs like drag inputs.

BACKGROUND OF THE INVENTION

The use of mobile terminals such as smart phones and tablet computers has become commonplace, and the mobile terminals may provide a variety of useful features to users with the help of a wide variety of applications.

An increase in the number of applications available in mobile terminals may result in an increase in the number of icons of installed applications, and wider display screens may be required to display these icons.

However, given the limited size of a display of mobile terminals due to their portability, it is not easy to display, on a single display screen, all icons corresponding to applications installed in mobile terminals having a display with a limited size. A conventional method provided to solve these and other problems is to provide a plurality of display screens, arrange different icons corresponding to applications on different display screens, and run a specific application after switching the display screens if necessary.

For example, if a user wants to run an application of an icon arranged on a screen #2 while staying in a screen #1, the user may switch the display screens from the screen #1 to the screen #2 by entering a touch input of a right-to-left drag on the touch screen on which the screen #1 is being displayed.

In switching display screens on the touch screen of mobile terminals as described with reference to the foregoing examples, technology for detecting positions of user's touch inputs on the touch screen may be used.

For example, a resistive touch screen may detect positions of touch inputs depending on changes in pressure due to user's touch inputs, and a capacitive touch screen may detect positions of touch inputs depending on changes in capacitance due to user's touch inputs.

Conventional technology for determining positions of user's touch inputs has no separate correction functions for position determination. Thus, when display screens are updated depending on touch inputs, the display screens may not be smoothly displayed. Examples thereof are as shown in FIG. 1.

Figure 1:
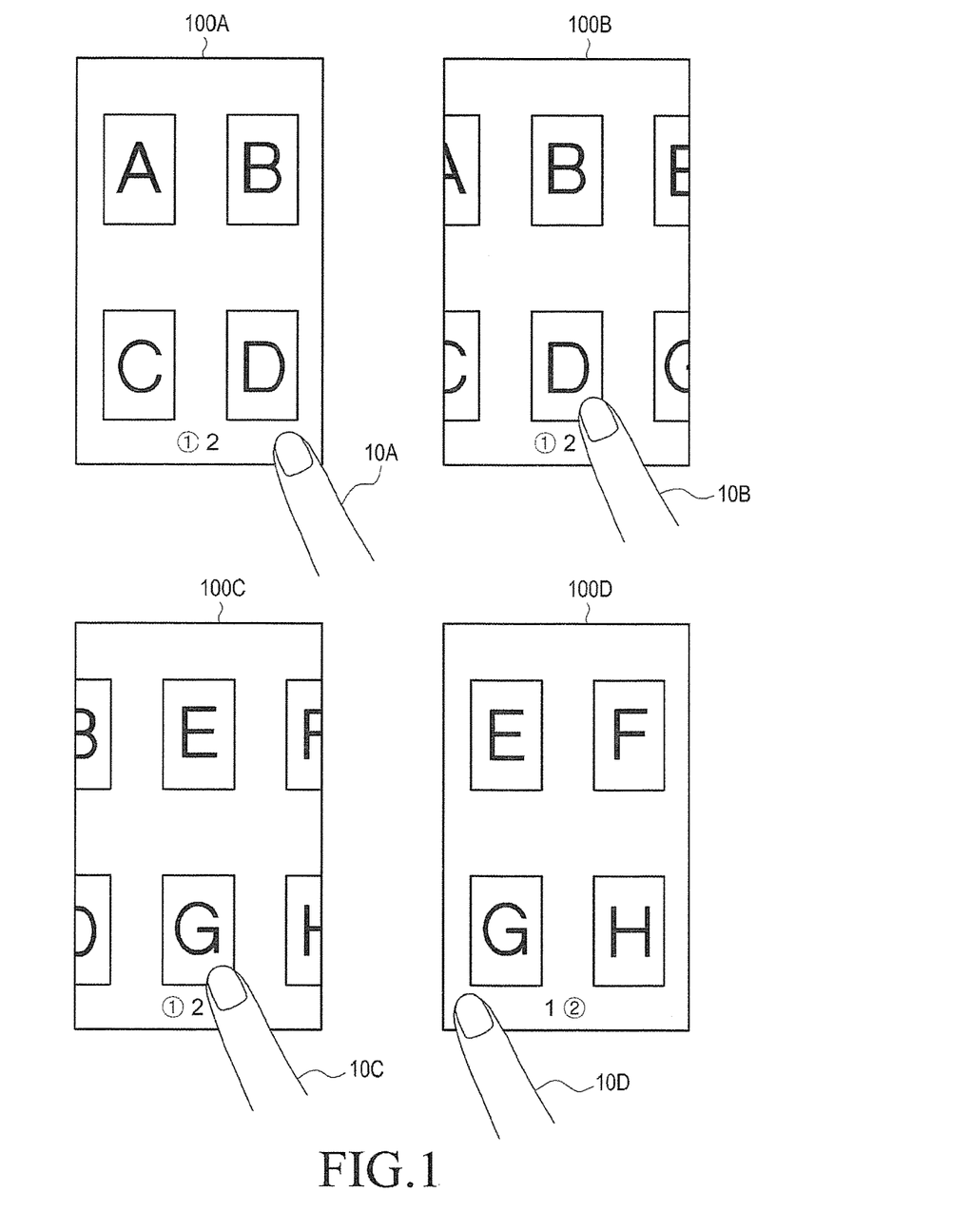
FIG. 1 shows a method for scrolling display screens.

Referring to FIG. 1, icons corresponding to applications A to D are arranged (or displayed) on a screen #1 as shown by reference numeral 100A, and icons corresponding to applications E to H are arranged on a screen #2 as shown by reference numeral 100D. In order to switch from the display screen 100A to the display screen 100D, a user enters touch inputs (e.g., a right-to-left drag) in order of 10A to 10D, and a mobile terminal updates and displays the display screens in order of 100A, 100B, 100C and 100D depending on the user's touch inputs 10A to 10D.

Updating and displaying the display screens in order of 100A, 100B, 100C and 100D may be construed to update display screens to correspond to the touch positions obtained by detecting the touch positions 10A, 10B, 10C and 10D.

However, the conventional technology does not perform a correction operation in determining touch positions 10A to 10D of the user's touch inputs. Thus, when display screens are updated and displayed in order of 100A, 100B 100C and 100D, the display screens may be unsmoothly displayed.

Therefore, there is a need for a method and apparatus for smoothly displaying updated display screens, when updating and displaying display screens depending on user's touch inputs on a touch screen, such as screen switching and screen scrolling.

SUMMARY OF THE INVENTION

To address the above-discussed deficiencies of the prior art, it is a primary object to provide a method and apparatus for smoothly scrolling or updating display screens on a touch screen.

In accordance with one aspect of the present disclosure, there is provided a method for handling a touch input in a mobile terminal. The method includes, upon detecting a touch input, determining an actual coordinate value of the detected touch input, and obtaining a predicted coordinate value for the determined actual coordinate value. The method also includes obtaining a smoothed coordinate value by performing a smoothing operation on the obtained predicted coordinate value, and determining that the detected touch input has occurred at the obtained smoothed coordinate value.

In accordance with another aspect of the present disclosure, there is provided an apparatus for handling a touch input in a mobile terminal. The apparatus includes a display comprising a touch screen, and a controller. The controller is configured to, upon detecting a touch input on the touch screen, determine an actual coordinate value of the detected touch input, obtain a predicted coordinate value for the determined actual coordinate value, obtain a smoothed coordinate value by performing a smoothing operation on the obtained predicted coordinate value, and determine that the detected touch input has occurred at the obtained smoothed coordinate value. The apparatus also includes a memory configured to store the determined actual coordinate value, the obtained predicted coordinate value for the determined actual coordinate value, and the obtained smoothed coordinate value for the obtained predicted coordinate value.

In accordance with another aspect of the present disclosure, there is provided a method for handling a touch input in a mobile terminal. The method includes, upon occurrence of a user's touch input, filtering a user's touch input value using at least one digital filter. The method also includes generating a touch input compensation value using the filtered touch input value, and compensating for the user's touch input value with the touch input compensation value.

In accordance with yet another aspect of the present disclosure, there is provided an apparatus for handling a touch input in a mobile terminal. The apparatus includes a touch screen. The apparatus also includes at least one digital filter configured to filter a user's touch input value, if the user's touch input has occurred on the touch screen. The apparatus further includes a controller configured to generate a touch input compensation value using the filtered touch input value, and compensate for the user's touch input value with the touch input compensation value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B show a second example of a process of scrolling display screens to correspond to touch inputs according to an embodiment of the present disclosure;

Throughout the drawings, the same drawing reference numerals will be understood to refer to the same elements, features and structures.

DETAILED DESCRIPTION OF THE INVENTION

FIGS. 2 through 11E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present disclosure will now be described in detail with reference to the accompanying drawings. In the following description, specific details such as detailed configuration and components are merely provided to assist the overall understanding of embodiments of the present disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Mobile terminals, to which embodiments of the present disclosure are applicable, are easy-to-carry mobile electronic devices, and may include video phones, mobile phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, e-Book readers, portable computers (e.g., laptop computers, tablet computers), and digital cameras. A mobile terminal to which embodiments of the present disclosure are applicable will be described below with reference to FIG. 2.

Figure 2:
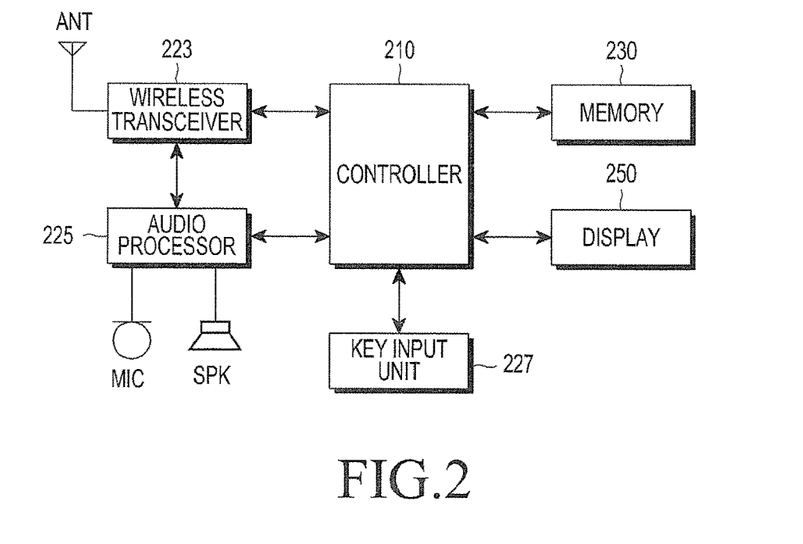
FIG. 2 shows a structure of a mobile terminal according to an embodiment of the present disclosure.

Referring to FIG. 2, a wireless transceiver 223 includes a Radio Frequency (RF) unit and a modulator/demodulator (MODEM). The RF unit includes an RF transmitter for up-converting a frequency of transmission signals and amplifying the up-converted transmission signals, and an RF receiver for low-noise-amplifying received signals and down-converting a frequency of the amplified received signals. The MODEM includes a transmitter for coding and modulating the transmission signals, and a receiver for demodulating and decoding the received signals output from the RF unit.

An audio processor 225 may constitute a coder/decoder (codec), and the codec includes a data codec and an audio codec. The data codec processes packet data and the like, and the audio codec processes audio signals such as voice and multimedia files. The audio processor 225 converts digital audio signals received from the MODEM into analog audio signals by means of the audio codec, and plays the analog audio signals using a speaker SPK. The audio processor 225 converts analog audio signals picked up by a microphone MIC into digital audio signals by means of the audio codec, and transfers the digital audio signals to the MODEM. The codec may be separately provided, or may be included in a controller 210.

A key input unit 227 may include numeric/character keys for inputting numeric/character information, and function keys or a touch pad for setting various function keys. When a display 250 is implemented to have a resistive or capacitive touch screen, the key input unit 227 may include a minimum number of predetermined keys, and the display 250 may replace part of the key input function of the key input unit 227.

A memory 230 may include a program memory and a data memory. The program memory stores a control program for controlling the general operations of the mobile terminal. The memory 230 may further include external memories such as Compact Flash (CF) cards, Secure Digital (SD) cards, Micro Secure Digital (Micro-SD) cards, Mini Secure Digital (Mini-SD) cards, Extreme Digital (xD) cards, and memory sticks. The memory 230 may also include storage disks such as Hard Disk Drive (HDD) and Solid State Disk (SSD).

In accordance with embodiments of the present disclosure, the memory 230 stores actual coordinate values of touch inputs, predicted coordinate values obtained from the actual coordinate values, and smoothed coordinate values, which are input as shown in FIGS. 5A and 5B.

The display 250 may include Liquid Crystal Display (LCD) or Organic Light Emitting Diodes (OLED), which is classified into Passive Mode OLED (PMOLED) and Active Mode OLED (AMOLED), and output various display information generated by the mobile terminal. Although the display 250 may include a capacitive or resistive touch screen to serve as an input unit for controlling the mobile terminal, together with the key input unit 227, the display 250 according to an embodiment of the present disclosure is assumed include a capacitive touch screen, and may have resolutions of 480×320, 800×480, 854×480, 960×240, 1024×600, 1024×768, 1280×720 and 1280×800. The display 250 may include a touch layer for detecting user's touch inputs on the touch screen, to detect coordinate values (e.g., pixel coordinate values or pixel positions) on the touch screen for the detected user's touch inputs, and provide the detected coordinate values to the controller 210. A detailed description thereof will be omitted, since it is well known in the art.

In accordance with embodiments of the present disclosure, the controller 210 controls the overall operation of the mobile terminal, and may switch or control operations of the mobile terminal depending on user inputs received through the key input unit 227 and/or the display 250. The controller 210 includes, upon detecting a touch input, determining an actual coordinate value of the detected touch input, obtaining a predicted coordinate value for the determined actual coordinate value, obtaining a smoothed coordinate value by performing a smoothing operation on the obtained predicted coordinate value, and determining that the detected touch input has occurred at the obtained smoothed coordinate value. A detailed operation of the controller 210 according to an embodiment of the present disclosure will be described in detail below.

Figure 3:
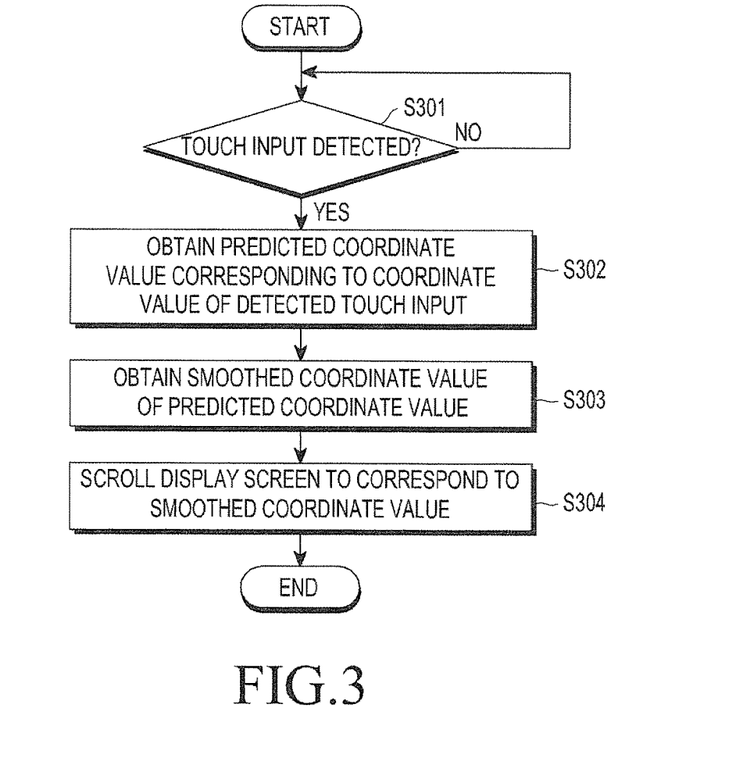
FIG. 3 shows a process of scrolling display screens to correspond to touch inputs according to an embodiment of the present disclosure.
Figure 4:
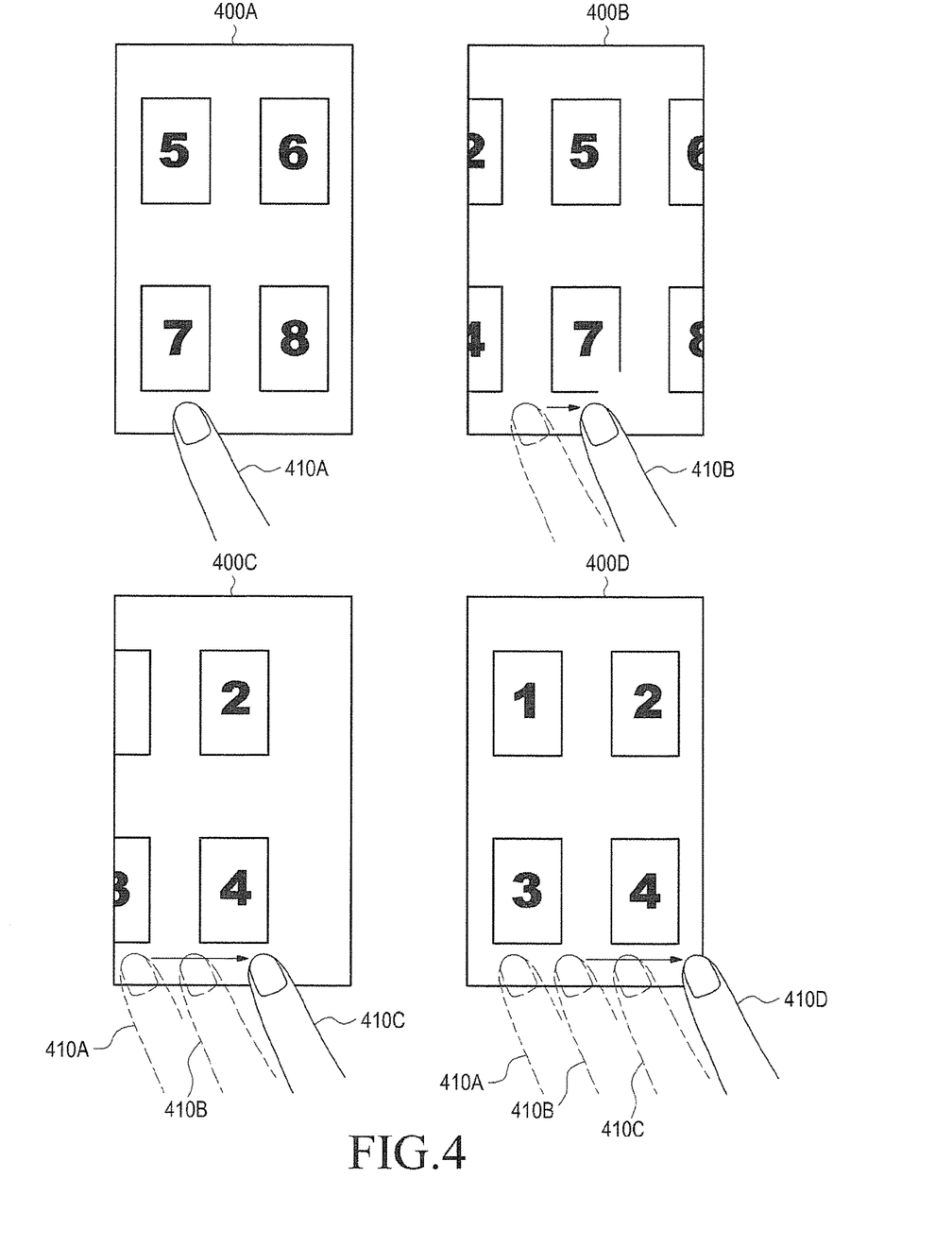
FIG. 4 shows a first example of a process of scrolling display screens to correspond to touch inputs according to an embodiment of the present disclosure.
Figure 6:
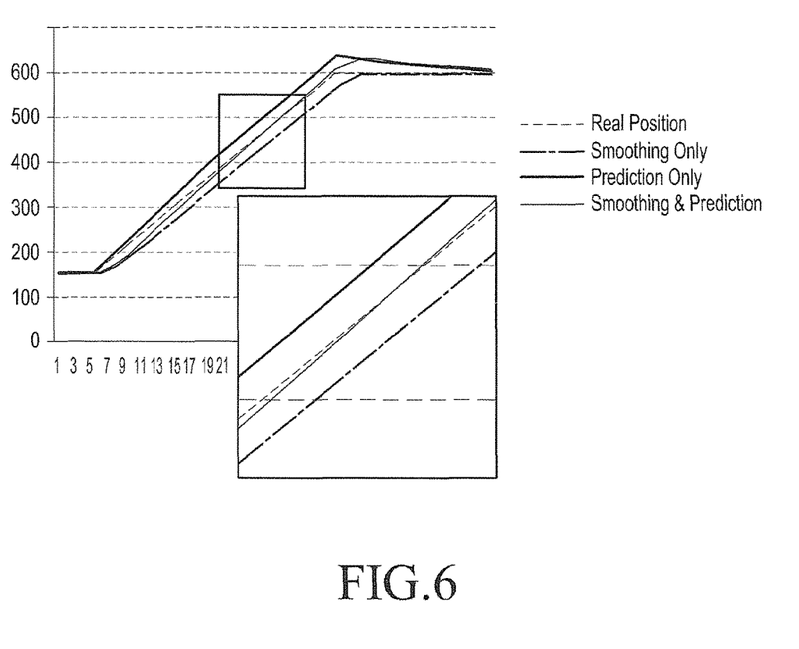
FIG. 6 shows a third example of a process of scrolling display screens to correspond to touch inputs according to an embodiment of the present disclosure.

FIG. 3 shows a process of scrolling display screens to correspond to touch inputs according to an embodiment of the present disclosure. FIG. 4 shows a first example of a process of scrolling display screens to correspond to touch inputs according to an embodiment of the present disclosure. FIGS. 5A and 5B show a second example of a process of scrolling display screens to correspond to touch inputs according to an embodiment of the present disclosure. FIG. 6 shows a third example of a process of scrolling display screens to correspond to touch inputs according to an embodiment of the present disclosure. A process of scrolling display screens to correspond to touch inputs according to an embodiment of the present disclosure will be described below with reference to FIGS. 1 to 6.

Prior to a description of an embodiment of the present disclosure, the conventional process of scrolling display screens depending on touch inputs will be described. Generally, a user may request to scroll display screens in the vertical or horizontal direction by entering vertical or horizontal drag touch inputs. In this way, the user may check display items (e.g., icons) being displayed on the display screens, by scrolling them, or may request switching from the current screen to the previous or next screen.

Even though user's touch inputs occur on the touch screen in a specific direction (e.g., horizontal direction) at a constant speed, the mobile terminal may be overloaded by multitasking, or high frequencies may be generated, which cause a malfunction of the capacitive touch screen. In this overload or high-frequency environment, if the mobile terminal scrolls display screens to correspond to coordinate values of the detected touch inputs in the conventional way, the mobile terminal is likely to undergo a change in speed of scrolling.

The reason why the scrolling speed for display screens is not constant, even though the user enters drag inputs at a constant speed, is that coordinate values of the touch inputs are not detected at regular intervals. If the scrolling speed for the display screens is not constant, the user may observe that the display screens are scrolled unsmoothly.

To solve the above and other problems of the prior art, the present disclosure scrolls display screens using a prediction algorithm and a smoothing algorithm. An embodiment of the present disclosure using the prediction algorithm and smoothing algorithm will be described with reference to FIGS. 1 to 6.

In the following description of the present disclosure, even though pixel position values of the display 250 have two different types of values (horizontal position values and vertical position values), actual coordinate values of the detected touch inputs are assumed to have only one type of position values as shown in FIGS. 5A and 5B, because only the substantial displacements corresponding to a scrolling direction for display screens are considered. For example, in an embodiment of the present disclosure, the mobile terminal determines pixel position values of touch inputs which have successively occurred, and receives and processes only the substantial displacements of the horizontal pixel position values as the actual coordinate values of touch inputs if horizontal drag touch inputs occur.

For example, if a pixel position value of a touch input that has occurred first is (220, 250) and a pixel position value of a touch input that has occurred second is (230, 253), generating a left-to-right touch input, then the actual coordinate value of the first touch input is processed as 220 and the actual coordinate value of the second touch input is processed as 230, in an embodiment of the present disclosure.

Referring to FIG. 3, in blocks 5301 to 5304, the controller 210, upon detecting a touch input on a touch screen of the display 250, obtains a predicted coordinate value corresponding to a coordinate value of the detected touch input, obtains a smoothed coordinate value for the obtained predicted coordinate value, and then scrolls and displays a display screen to correspond to the obtained smoothed coordinate value.

In the following description, it is assumed that the display 250 has a resolution of 1024×768 (with a vertical resolution of 1024 and a horizontal resolution of 768), and for the touch screen on which the user has entered touch inputs, a coordinate value of a touch input 410A shown in FIG. 4 corresponds to an actual coordinate value for #1 shown in FIG. 5A, and a coordinate value of a touch input 410D shown in FIG. 4 corresponds to an actual coordinate value for #54 shown in FIG. 5B.

If left-to-right drag touch inputs are received from the user in order of the touch input 410A to the touch input 410D shown in FIG. 4, the controller 210 detects actual coordinate values of a total of 54 user's touch inputs in order of #1 to #54 as shown in FIGS. 5A and 5B. Although they may vary depending on the operating system (OS) or settings of the mobile terminal, touch inputs and their coordinate values may be detected at intervals of 16.6 ms in Android® OS, so touch inputs #1 to #54 shown in FIGS. 5A and 5B may be construed to occur for a time of 16.6*53=879.8 ms.

FIGS. 5A and 5B shows actual coordinate values for detected touch inputs, predicted coordinate values obtained from the actual coordinate values, and smoothed coordinate values for the predicted coordinate values, when the touch inputs are detected in order of #1 to #54 depending on the drag touch inputs in order of the touch input 410A to the touch input 410D shown in FIG. 4. As described above, if display screens are scrolled to correspond to the actual coordinate values of the touch inputs which have occurred in order of #1 to #54 as in the prior art, the scrolling may not be displayed smoothly.

To address these and other problems, the controller 210 first obtains predicted coordinate values x' corresponding to the actual coordinate values by applying the prediction algorithm to the actual coordinate values for every detected touch inputs, obtains smoothed coordinate values from the obtained predicted coordinate values, and scrolls display screens to correspond to the obtained smoothed coordinate values. In other words, the present disclosure scrolls display screens with the smoothed coordinate values instead of the actual coordinate values of the touch inputs.

First, a method of obtaining predicted coordinate values will be described. Predicted coordinate values x' are obtained by calculating xH, xL, d, preH and preL using Equation (1) below. On the assumption that as for the values of constants a, b and c associated with xH, xL and d, a sum of 'a' and 'b' is 1, they may vary for their optimization depending on system performance and display resolution. For example, 'a' and 'b' are 0.1 and 0.9, respectively, or 'a' and 'b' may have values of 0.2 and 0.8, respectively, and even though 'c' has a value greater than 0, 'c' is assumed to have a value of 0.3 in an embodiment of the present disclosure.

When initial values of preH and preL are the same as x, $xH = preH*a + x*b$ $xL = preL*b + x*a$ $d = (xH - xL)*c$ $x' = xH + d,$ $preH = xH,$ $preL = xL$ [Eqn. 1]

It is noted in Equation (1) that values of preH, preL and x are the same (i.e., preH=preL=x) at an occasion (e.g., #1 in FIG. 5A) where a touch input is first detected, and if touch inputs are continuously detected later on, preH is updated with a value of xH, and preL is updated with a value of xL.

For example, assuming that a touch input with an actual coordinate value of 150 is first detected as shown by #1 in FIG. 5A and a=0.1, b=0.9, and c=0.3, if Equation (1) is applied, values of preH, preL and x are the same to 150 because they are initial values. As a result, $xH = 150*0.1 + 150*0.9 = 150$ $xL = 150*0.9 + 150*0.1 = 150$ $d = (150 - 150)*0.3 = 0$ $x' = 150 + 0$ $preH = 150,$ $preL = 150$ From this, a predicted coordinate value is obtained as 150, preH is designated as 150 which is a value of xH, and preL is designated as 150 which is a value of xL.

If a predicted coordinate value (e.g., 150) is obtained, which corresponds to an actual coordinate value (e.g., 150) of a touch input of #1 shown in FIG. 5A, then the controller 210 obtains a smoothed coordinate value for the predicted coordinate value by applying the smoothing algorithm to the predicted coordinate value.

FIGS. 5A and 5B show that as for predicted coordinate values calculated from actual coordinate values of touch inputs, the predicted coordinate values are greater than the actual coordinate values. If display screens are scrolled to correspond to the predicted coordinate values, the display screens are not likely to be scrolled as intended by the user. Therefore, the present disclosure obtains smoothed coordinate values by applying the smoothing algorithm to the predicted coordinate values obtained from the actual prediction values of the touch inputs.

The smoothed coordinate value is a value corresponding to an average value of the current coordinate value (e.g., predicted coordinate value) and a predetermined number of its preceding coordinate values (e.g., predicted coordinate values). In an embodiment of the present disclosure, it is assumed that a smoothed coordinate value is obtained by calculating an average of five predicted coordinate values (e.g., the current predicted coordinate value and its four preceding predicted coordinate values). In an alternative embodiment, if a smoothed coordinate value is obtained from six predicted coordinate values, a smoothed coordinate value of the current touch input may be obtained by calculating an average value of a predicted coordinate value of the current touch input, for which the smoothed coordinate value is to be obtained, and its five preceding predicted coordinate values of the five preceding touch inputs.

However, when a smoothed coordinate value is calculated for a touch input of #1 shown in FIG. 5A, there are no four touch inputs which have occurred before the touch input of #1, because the touch input of #1 is the first touch input, meaning that it is not possible to obtain predicted coordinate values of touch inputs which have occurred before the touch input of #1.

Therefore, when calculating smoothed coordinate values for touch inputs of #1 to #4, the present disclosure applies the same value as the predicted coordinate value of the current touch input, as predicted coordinate values of the touch inputs which have not occurred before the current touch input, in calculating a smoothed coordinate value by calculating an average of five predicted coordinate values.

For example, when obtaining a smoothed coordinate value for the touch input of #1 shown in FIG. 5A, the present disclosure obtains a smoothed coordinate value of 150 for the touch input of #1 by computing (150+150+150+150+150)/5, assuming that there are four touch inputs which have occurred before the touch input of #1 and have a predicted coordinate value of 150. Similarly, when obtaining a smoothed coordinate value for the touch input of #3 shown in FIG. 5A, the present disclosure obtains a smoothed coordinate value of 150 for the touch input of #3 by computing (150+150+150+150+150)/5, assuming that there are two touch inputs which have occurred before the touch input of #1 and have the same predicted coordinate values of 150 as the predicted coordinate value of the touch input of #3, because only the touch inputs of #1 and #2 have occurred before the touch input of #3.

As another example, a smoothed coordinate value of 203.528202 obtained for a touch input corresponding to #10, for which an actual coordinate value is detected as 225 and a predicted coordinate value is obtained as 239.41851, corresponds to an average value obtained by dividing a sum (=1017.64101) of a predicted coordinate value of 167.1 corresponding to the touch input of #6, a predicted coordinate value of 185.55 corresponding to the touch input of #7, a predicted coordinate value of 203.811 corresponding to the touch input of #8, a predicted coordinate value of 221.7615 corresponding to the touch input of #9, and a predicted coordinate value of 239.41851 corresponding to the touch input of #10, by 5.

It may be noted that the resulting values shown in FIGS. 5A and 5B are derived by sequentially obtaining predicted coordinate values detected for the touch inputs of #1 to #54 in FIGS. 5A and 5B and calculating smoothed coordinate values from the obtained predicted coordinate values, as described so far.

Based on the foregoing description, if touch inputs occur in order of 410A to 410D shown in FIG. 4, the controller 210 calculates and obtains smoothed coordinate values from actual coordinate values of detected touch inputs in real time, and the controller 210 scrolls and displays display screens to correspond to the smoothed coordinate values, assuming (or determining) that the touch inputs have occurred to correspond to the obtained smoothed coordinate values.

For example, the controller 210 obtains a predicted coordinate value and a smoothed coordinate value corresponding to a touch input of #1 upon detecting the touch input of #1 shown in FIG. 5A. Thereafter, the controller 210 obtains a predicted coordinate value and a smoothed coordinate value corresponding to a touch input of #2 upon detecting the touch input of #2. Thereafter, the controller 210 obtains a predicted coordinate value and a smoothed coordinate value for each of touch inputs of #3 to #54 upon detecting the touch inputs of #3 to #54. The controller 210 scrolls and displays display screens 400A to 400D as shown in FIG. 4, assuming that the touch inputs have been received to correspond to the smoothed coordinate values for #1 to #54.

The actual coordinate values of detected touch inputs, the predicted coordinate values, and the smoothed coordinate values, which have been described so far, may be represented by curves as shown in FIG. 6.

Referring to FIG. 6, curves (Real Position) of pixel coordinate values for actual coordinate values of detected touch inputs, curves (Prediction Only) of predicted coordinate values, and curves (Smoothing & Prediction) of smoothed coordinate values are shown. As shown in FIG. 6, it may be noted that the curves of predicted coordinate values have greater values than the curves of actual coordinate values for user's touch inputs, but the curves of smoothed coordinate values have a similar pattern to those of the curves of the actual coordinate values. This can be noted even from the numerical values shown in FIGS. 5A and 5B.

Figure 7:
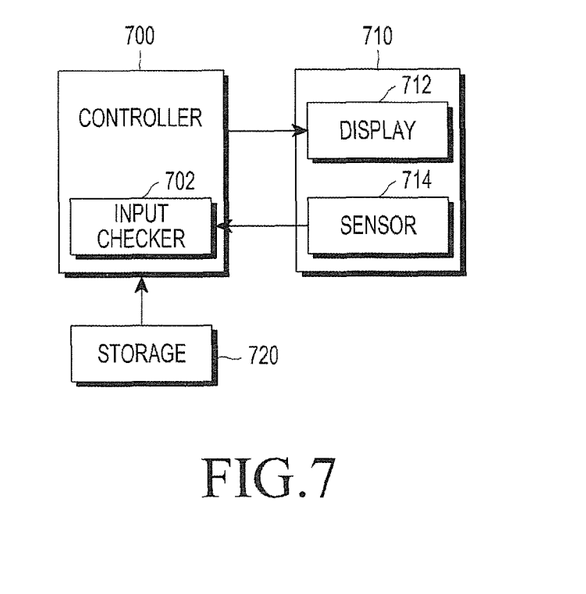
FIG. 7 shows a structure of a mobile terminal with a touch screen according to another embodiment of the present disclosure.

FIG. 7 shows a structure of a mobile terminal with a touch screen according to another embodiment of the present disclosure.

As shown, the mobile terminal includes a controller 700, a touch screen module 710, and a storage 720.

Figure 11A:
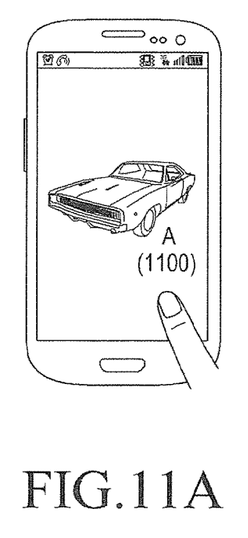
FIGS. 11A to 11E show an example of a screen configuration scrolled by touch inputs in a mobile terminal according to another embodiment of the present disclosure.
Figure 11B:
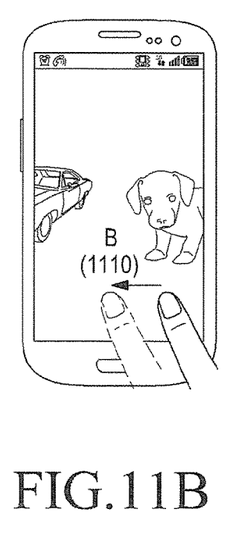
Figure 11C:
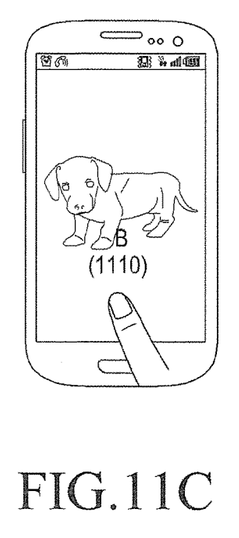
Figure 11D:
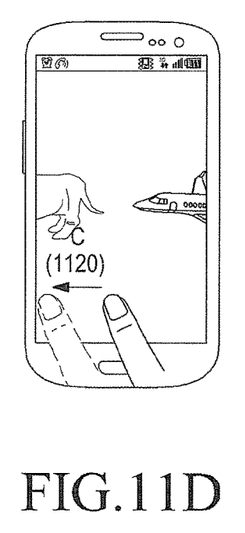
Figure 11E:
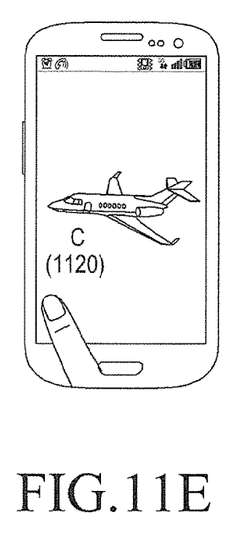

The controller 700 controls the overall operation of the mobile terminal. In addition, the controller 700 performs an operation corresponding to touch input information received from the touch screen module 710. For example, if a user drags a screen from a point A 1100 to a point B 1110 on the touch screen module 710 while the screen is being displayed as shown in FIG. 11A, the controller 700 switches screens as shown in FIG. 11B depending on the user's drag information to display the switched screen as shown in FIG. 11C. If the user drags the screen from the point B 1110 to a point C 1120 on the touch screen module 710 while the screen is being displayed as shown in FIG. 11C, the controller 700 switches screens as shown in FIG. 11D depending on the user's drag information to display the switched screen as shown in FIG. 11E.

An input checker 702 in the controller 700 compensates for touch inputs received from the touch screen module 710 to improve the mobile terminal's reaction speed to the user's touch inputs. For example, when the user drags the screen from the point B 1110 to the point C 1120 on the touch screen module 710 as shown in FIGS. 11D and 11E, the input checker 702 compensates for a coordinate difference between the point C 1120 and the point B 1110 with the previous coordinate difference between the point B 1110 and the point A 1100, which is a previous touch input.

The controller 700 may improve the mobile terminal's reaction speed to the user's touch inputs by performing an operation corresponding to the touch inputs compensated by the input checker 702.

The touch screen module 710 performs information display and information input functions together, using a touch screen. For example, the touch screen module 710 includes a display 712 and a sensor 714.

The display 712, under control of the controller 700, displays the mobile terminal's state information, user input characters, moving pictures, still pictures, and the like.

The sensor 714 recognizes information about the user's touches and provides it to the input checker 702 in the controller 700.

The storage 720 may include a program storage for storing programs for controlling operations of the mobile terminal, and a data storage for storing the data generated during execution of the programs.

Although not shown, the mobile terminal may further include an input unit. The input unit provides the controller 700 with input data generated by the user's selection. For example, the input unit may include a control button for controlling the mobile terminal. As another example, the input unit may include a keypad for receiving input data from the user, independently of the touch screen module 710.

The input checker 702 may improve the mobile terminal's reaction speed to the user's touch inputs by compensating for the current touch input value with the next touch input that is predicted considering the user's previous touch inputs as described above. However, the touch inputs received from the touch screen module 710 may include noises. In this situation, the input checker 702 may not accurately predict the user's next touch input due to the noises included in the touch inputs.

Accordingly, the input checker 702 may predict precise touch inputs by filtering noises for the touch inputs using digital filters.

A structure of the input checker 702 including one digital filter will be described below.

Figure 8:
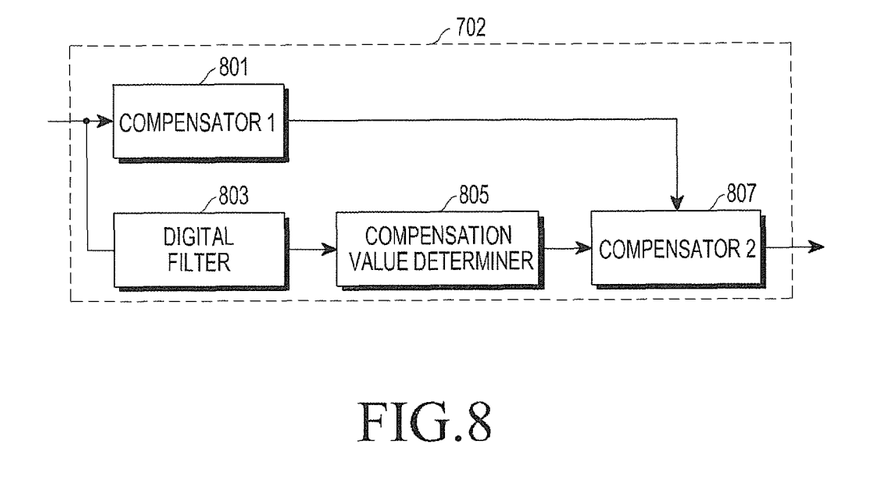
FIG. 8 shows a detailed structure of an input checker in a mobile terminal according to another embodiment of the present disclosure.

FIG. 8 shows a detailed structure of an input checker in a mobile terminal according to another embodiment of the present disclosure.

As shown, the input checker 702 includes a first compensator 801, a digital filter 803, a compensation value determiner 805, and a second compensator 807.

The first compensator 801 compensates touch input values by applying a preset control gain to touch inputs received from the touch screen module 710.

The digital filter 803 filters touch inputs received from the touch screen module 710 depending on its frequency characteristics. For example, when a user drags a screen from the point B 1110 to the point C 1120 on the touch screen module 710 as shown in FIGS. 11D and 11E, the digital filter 803 digitally filters touch inputs for the point C 1120.

The compensation value determiner 805 determines, as a compensation value, a difference between the touch input received from the touch screen module 710 and the filtered touch input. In other words, the compensation value determiner 805 predicts the user's next touch input using the difference between the touch input received from the touch screen module 710 and the filtered touch input. For example, when the user drags the screen from the point B 1110 to the point C 1120 on the touch screen module 710 as shown in FIGS. 11D and 11E, the compensation value determiner 805 determines, as a compensation value, a difference between the filtered touch input for the point C, which is received from the digital filter 803, and the touch input for the point C, which is received from the touch screen module 710.

The compensation value determiner 805 may apply a preset control gain to the compensation value.

The second compensator 807 calculates the final touch input value by combining the touch input value received from the first compensator 801 with the compensation value received from the compensation value determiner 805.

The controller 700 performs an operation corresponding to the final touch input value received from the second compensator 807. For example, if the user performs a drag action for screen switching, the input checker 702 compensates the current touch input value by predicting the next touch input value. Accordingly, the controller 700 may improve the mobile terminal's reaction speed to the user's touch inputs as it shifts the screens depending on the current touch input including the predicted next touch input value.

In the above-described embodiment, the input checker 702 compensates touch input values using one digital filter. The input checker 702 may also compensate touch input values using a plurality of digital filters.

Figure 9:
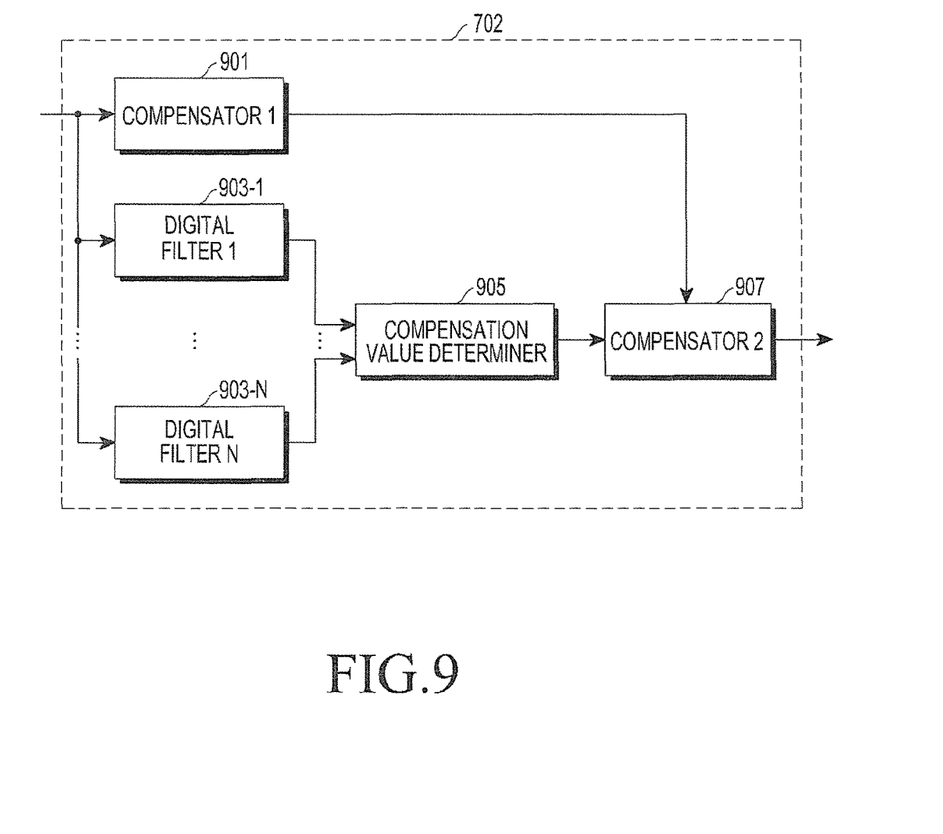
FIG. 9 shows a detailed structure of an input checker in a mobile terminal according to another embodiment of the present disclosure.

FIG. 9 shows a detailed structure of an input checker in a mobile terminal according to another embodiment of the present disclosure.

As shown, the input checker 702 includes a first compensator 901, digital filters 903-1 to 903-N, a compensation value determiner 905, and a second compensator 907.

The first compensator 901 compensates touch input values by applying a preset control gain to touch inputs received from the touch screen module 710.

The digital filters 903 filter touch inputs received from the touch screen module 710 depending on their frequency characteristics. For example, if the user drags the screen from the point B 1110 to the point C 1120 on the touch screen module 710 as shown in FIGS. 11D and 11E, the digital filters 903 digitally filter touch inputs for the point C 1120 depending on their frequency characteristics. The digital filters 903-1 to 903-N have different frequency characteristics.

The compensation value determiner 905 determines a difference between the filtered touch inputs, as a compensation value. In other words, the compensation value determiner 905 predicts the user's next touch inputs using the difference between the touch inputs filtered by the digital filters 903. For example, the compensation value determiner 905 determines, as a compensation value, a difference between the touch input filtered by the digital filter having the highest-frequency characteristics and the touch input filtered by the digital filter having the lowest-frequency characteristics. As another example, the compensation value determiner 905 may determine, as a compensation value, an average of differences between outputs of two consecutive digital filters. The compensation value determiner 905 may apply a preset control gain to the compensation value.

The second compensator 907 calculates the final touch input value by combining the touch input value received from the first compensator 901 with the compensation value received from the compensation value determiner 905.

The controller 700 performs an operation corresponding to the final touch input value received from the second compensator 907. For example, if the user performs a drag action for screen switching, the input checker 702 compensates the current touch input value by predicting the next touch input value. Accordingly, the controller 700 may improve the mobile terminal's reaction speed to the user's touch inputs as it shifts the screens depending on the current touch input including the predicted next touch input value.

A method for compensating touch inputs will be described below.

Figure 10:
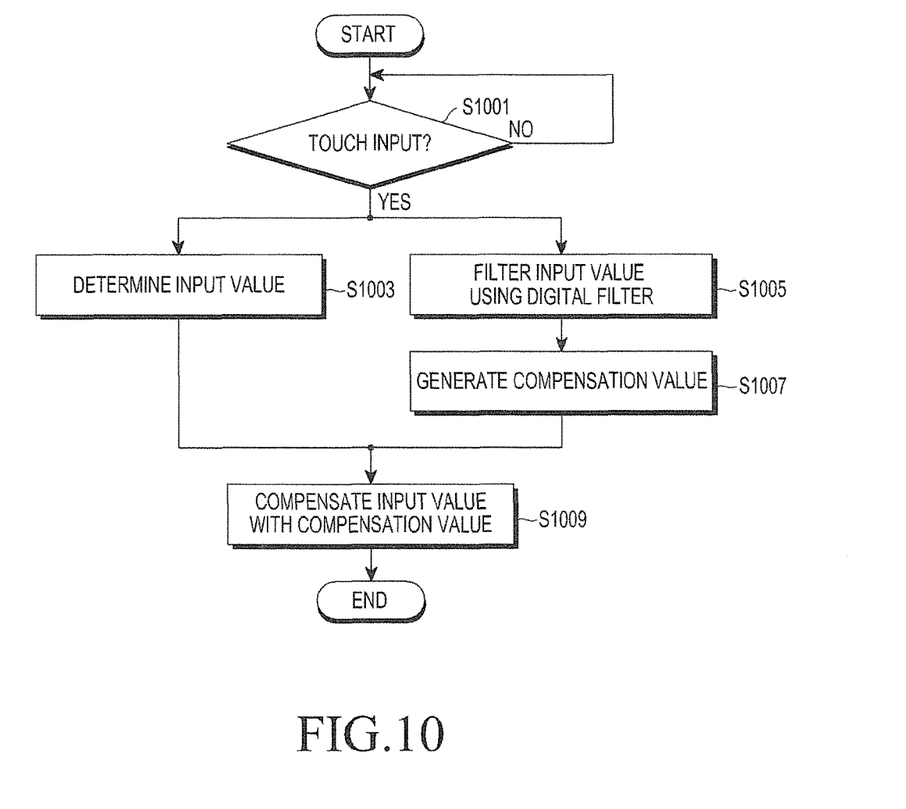
FIG. 10 shows a process of recognizing touch inputs in a mobile terminal according to another embodiment of the present disclosure.

FIG. 10 shows a process of recognizing touch inputs in a mobile terminal according to another embodiment of the present disclosure.

Referring to FIG. 10, the mobile terminal (e.g., the controller 700) determines in block S1001 whether a touch input occurs by a user. For example, in the embodiment of FIG. 7, the mobile terminal determines whether a user's touch input occurs on the touch screen module 710.

If a user's touch input occurs, the mobile terminal determines a user's touch input value in block S1003. The mobile terminal may apply a preset control gain to the user's touch input value.

Also, if a user's touch input occurs, the mobile terminal filters a user's touch input value using at least one digital filter in block S1005.

Thereafter, in block S1007, the mobile terminal generates a compensation value to compensate for the user's touch input value. For example, if it uses one digital filter, the mobile terminal generates a compensation value by calculating a difference between the user's touch input value and the touch input value filtered by the digital filter. As another example, if it uses a plurality of digital filters, the mobile terminal may generate a compensation value by calculating a difference between a touch input filtered by the digital filter having the highest-frequency characteristics and a touch input filtered by the digital filter having the lowest-frequency characteristics. As yet another example, if it uses a plurality of digital filters, the mobile terminal may generate a compensation value by calculating an average of differences between outputs of two consecutive digital filters. The mobile terminal may apply a preset control gain to the compensation value.

After determining the user's touch input value and generating the compensation value, the mobile terminal generates the final touch input value by compensating the user's touch input value with the compensation value in block S1009. For instance, the mobile terminal may generate the final touch input value by adding the compensation value to the user's touch input value.

Thereafter, the mobile terminal terminates this algorithm, performing an operation corresponding to the final touch input value generated in block S1009.

In accordance with embodiments of the present disclosure, which have been described so far, the present disclosure may solve the problems that even though the user enters drag touch inputs at a constant speed, the scrolling speed for display screens is not constant, thereby allowing the display screens to be smoothly scrolled.

In addition, the mobile terminal with a touch screen may compensate for touch inputs by predicting the next touch inputs using at least one digital filter, thereby improving its reaction speed to touch inputs.

Further, the mobile terminal may compensate for touch inputs by predicting the next touch inputs using at least one digital filter, thereby reducing touch input errors caused by noises.

The mobile terminal may compensate touch inputs by predicting the next touch inputs using at least one digital filter, thereby reducing the storage's load to store previous touch input information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a mobile terminal comprising a touch screen, the method comprising:
    displaying a screen on the touch screen;
    detecting a plurality of touch inputs;
    determining an actual coordinate value of a first touch input among the plurality of touch inputs;
    obtaining a predicted coordinate value for the actual coordinate value of the first touch input;
    obtaining a smoothed coordinate value by performing a smoothing operation on the predicted coordinate value, the smoothing operation including calculating the smoothed coordinate value based on an average value of the predicted coordinate value of the first touch input and predicted coordinate values of predetermined touch inputs among the plurality of touch inputs, wherein the predetermined touch inputs are obtained before the detected touch input;
    determining that the first touch input has occurred at the obtained smoothed coordinate value; and
    scrolling the screen displayed on the touch screen according to the smoothed coordinate value.

2. The method of claim 1, further comprising controlling a display screen to correspond to the calculated smoothed coordinate value.

3. The method of claim 1, wherein obtaining a predicted coordinate value comprises obtaining the predicted coordinate value from the actual coordinate value using the following equation, $$xH = \text{pre}H \ast a + x \ast b$$

$$xL = \text{pre}L \ast b + x \ast a$$

$$d = (xH - xL) \ast c$$

$$x' = xH + d,$$

$$\text{pre}H = xH,$$

$$\text{pre}L = xL$$

where x' represents the predicted coordinate value, and x represents the actual coordinate value;
wherein initial values of preH and preL are the same as the actual coordinate value x, 'a' 'b' and 'c' are numbers, a sum of 'a' and 'b' is 1, and 'c' has a value greater than zero (0).

4. The method of claim 1, wherein obtaining the predicted coordinate value comprises calculating the predicted coordinate value to account for a detection interval of the mobile terminal used in detecting the touch input.

5. The method of claim 1, wherein calculating the smoothed coordinate value comprises:
    if a first number of first touch inputs, occurrence of which has been detected before a second touch input, does not correspond to the first number, obtaining the smoothed coordinate value by calculating an average value of a first number of predicted coordinate values, assuming that non-occurred touch inputs have the same predicted coordinate value as the predicted coordinate value of the second touch input.

6. An apparatus for controlling a mobile terminal comprising a touch screen, the apparatus comprising:
    a display comprising a touch screen;
    a controller configured to:
        display a screen on the touch screen;
        detect a plurality of touch inputs;
        determine an actual coordinate value of a first touch input;
        obtain a predicted coordinate value for the determined actual coordinate value of the first touch input;
        obtain a smoothed coordinate value by performing a smoothing operation on the predicted coordinate value, the smoothing operation including calculating the smoothed coordinate value based on an average value of the predicted coordinate value of the first touch input and predicted coordinate values of a predetermined number of touch inputs among the plurality of touch inputs, wherein the predetermined touch inputs are obtained before the first touch input;
        determine that the first touch input has occurred at the obtained smoothed coordinate value; and
        scroll the screen displayed on the touch screen according to the smoothed coordinate value; and
    a memory configured to store the determined actual coordinate value, the predicted coordinate value for the determined actual coordinate value, and the obtained smoothed coordinate value for the obtained predicted coordinate value.

7. The apparatus of claim 6, wherein the controller is configured to control a display screen of the display to correspond to the calculated smoothed coordinate value.

8. The apparatus of claim 6, wherein the controller is configured to obtain the predicted coordinate value from the actual coordinate value using the following equation, $$xH = preH * a + x * b$$

$$xL = preL * b + x * a$$

$$d = (xH - xL) * c$$

$$x' = xH + d,$$

$$preH = xH,$$

$$preL = xL$$

where x' represents the predicted coordinate value, and x represents the actual coordinate value;

wherein initial values of preH and preL are the same as the actual coordinate value x, 'a' 'b' and 'c' are numbers, a sum of 'a' and 'b' is 1, and 'c' has a value greater than zero (0).

9. The apparatus of claim 6, wherein the controller is configured to obtain the predicted coordinate value by calculating the predicted coordinate value to account for a detection interval of the mobile terminal used in detecting the touch input.

10. The apparatus of claim 9, wherein if a first number of the first touch inputs, occurrence of which has been detected before a second touch input, does not correspond to the first number, the controller obtains the smoothed coordinate value by calculating an average value of a first number of predicted coordinate values, assuming that non-occurred touch inputs have the same predicted coordinate value as the predicted coordinate value of the second touch input.

* * * * *